(12) United States Patent
Truche et al.

(10) Patent No.: US 7,495,231 B2
(45) Date of Patent: *Feb. 24, 2009

(54) MALDI SAMPLE PLATE IMAGING WORKSTATION

(75) Inventors: Jean-Luc Truche, Los Altos, CA (US); Gregor T. Overney, Sunnyvale, CO (US); William D. Fisher, San Jose, CO (US); Richard P. Tella, Sunnyvale, CO (US)

(73) Assignee: Agilent Technologies, Inc., Santa Clara, CA (US)

( * ) Notice: Subject to any disclaimer, the term of this patent is extended or adjusted under 35 U.S.C. 154(b) by 456 days.

This patent is subject to a terminal disclaimer.

(21) Appl. No.: 11/223,285

(22) Filed: Sep. 8, 2005

(65) Prior Publication Data

US 2007/0051899 A1    Mar. 8, 2007

(51) Int. Cl.
*H01J 27/00* (2006.01)
*H01J 27/24* (2006.01)

(52) U.S. Cl. .............. 250/423 P; 250/281; 250/282; 250/283; 250/288; 250/290; 250/291; 250/284; 250/285; 250/287; 250/424; 204/464; 204/462; 204/180.1; 204/614

(58) Field of Classification Search .............. 250/281, 250/282, 283, 288, 290, 291, 284, 285, 287, 250/423 P, 424; 204/464, 462, 180.1, 614

See application file for complete search history.

(56) References Cited

U.S. PATENT DOCUMENTS

| 4,898,471 | A | 2/1990 | Vaught et al. |
| 4,935,623 | A | 6/1990 | Knauer |
| 5,498,545 | A | 3/1996 | Vestal |
| 5,595,636 | A | 1/1997 | Franzen |
| 5,808,300 | A | 9/1998 | Caprioli |
| 5,821,063 | A | 10/1998 | Patterson et al. |
| 5,827,659 | A | 10/1998 | Patterson |
| 5,840,256 | A | 11/1998 | Demers et al. |
| 5,861,623 | A | 1/1999 | Park |
| 5,869,240 | A | 2/1999 | Patterson |
| 5,969,350 | A | 10/1999 | Kerley et al. |

(Continued)

FOREIGN PATENT DOCUMENTS

WO    2002084577    10/2002

(Continued)

OTHER PUBLICATIONS http://www.srsmaldi.com/Profler/Prof_Soft.htnl. Profiler Software: Dr. Palton, Jun. 16, 2003.

(Continued)

*Primary Examiner*—Jack I. Berman
*Assistant Examiner*—Meenakshi S Sahu (57) ABSTRACT

The invention provides an apparatus for producing an image of a global surface of an ion source sample plate that is exterior to an ion source. In general terms, the apparatus contains a sample plate for an ion source, an imaging device (e.g., a CCD or CMOS camera) and an illumination device that is configured to produce a light beam that contacts the sample plate surface to define a grazing angle between the light beam and the sample plate surface. The apparatus may be present at a location that is remote to the ion source.

28 Claims, 6 Drawing Sheets

U.S. PATENT DOCUMENTS

| | | |
|---|---|---|
| 6,027,942 A | 2/2000 | Hutchens et al. |
| 6,221,626 B1 | 4/2001 | Bienvenut et al. |
| 6,288,390 B1 | 9/2001 | Sluzdak et al. |
| RE37,485 E | 12/2001 | Vestal |
| 6,353,423 B1 | 3/2002 | Kang et al. |
| 6,423,966 B2 | 7/2002 | Hillenkamp et al. |
| 6,448,065 B2 | 9/2002 | Laugharn, Jr. et al. |
| 6,503,711 B1 | 1/2003 | Krull et al. |
| 6,508,986 B1 | 1/2003 | Anderson et al. |
| 6,617,575 B1 | 9/2003 | Cramer |
| 6,673,315 B2 | 1/2004 | Sheridan et al. |
| 6,707,037 B2 | 3/2004 | Whitehouse |
| 6,804,410 B2 | 10/2004 | Lennon |
| 7,145,135 B1 * | 12/2006 | Overney .................. 250/288 |
| 2001/0048076 A1 | 12/2001 | Wakiyama et al. |
| 2002/0005478 A1 | 1/2002 | Hillenkamp et al. |
| 2002/0011561 A1 | 1/2002 | Park et al. |
| 2002/0011562 A1 | 1/2002 | Park |
| 2002/0044278 A1 | 4/2002 | Le |
| 2002/0074517 A1 | 6/2002 | Krutchinsky et al. |
| 2002/0094533 A1 | 7/2002 | Hess et al. |
| 2002/0109085 A1 | 8/2002 | Hillenkamp et al. |
| 2002/0123153 A1 | 9/2002 | Moon et al. |
| 2002/0158027 A1 | 10/2002 | Moon et al. |
| 2002/0186367 A1 | 12/2002 | Eytan et al. |
| 2002/0190203 A1 | 12/2002 | Valaskovic et al. |
| 2002/0191864 A1 | 12/2002 | Lennon et al. |
| 2003/0099847 A1 | 5/2003 | Cunningham et al. |
| 2003/0104378 A1 | 6/2003 | Allawi et al. |
| 2003/0136906 A1 | 7/2003 | Marsh |
| 2004/0217278 A1 | 11/2004 | Overney et al. |
| 2005/0045815 A1 | 3/2005 | Bui |

FOREIGN PATENT DOCUMENTS

| | | |
|---|---|---|
| WO | 2003073448 | 9/2003 |
| WO | 2005079360 | 9/2005 |

OTHER PUBLICATIONS

Spengler, B. et al., "Scanning Microprobe Matrix-Assisted Laser Desorption Ionization (SMALDI) Mass Spectrometry: Instrumentation for Sub-Micrometer Resolved LDI and MALDI Surface Analysis", Journal of the American Society for Mass Spectrometry, Jun. 1, 2002, pp. 735-749, vol. 13, No. 6.

EP Search Report dated Jul. 28, 2003, 3 pages, in EP Application No. EP 06254631, which corresponds to this application.

* cited by examiner

Directed light    Non directed light

Fig. 6

MALDI SAMPLE PLATE IMAGING WORKSTATION

BACKGROUND

Mass spectrometry is an analytical methodology used for qualitative and quantitative determination of compounds in chemical and biological samples. Analytes in a sample are ionized, separated according to their mass by a spectrometer and detected to produce a mass spectrum. The mass spectrum provides information about the masses and in some cases the quantities of the various analytes that make up the sample. In particular embodiments, mass spectrometry can be used to determine the molecular weight or the molecular structure of an analyte in a sample. Because mass spectrometry is fast, specific and sensitive, mass spectrometer devices have been widely used for the rapid identification and characterization of biological analytes.

During the last few years, matrix-based ionization methods, e.g., matrix-assisted laser desorption/ionization (MALDI) methods have proven to be valuable for the ionization of samples, and have found widespread use in a variety of fields such as genomics and proteomics. In performing matrix-based methods, a sample is combined with a matrix (generally an organic matrix) that co-crystallizes with the sample, and then deposited upon a sample plate. The sample plate is placed in an ion source, and an energy source, e.g., a laser beam, vaporizes the sample. During vaporization of the sample, analyte ions are formed. It is thought that the presence of the matrix enables the analyte to be ionized, solving a problem of other methods.

In many cases, matrix-based ion sources are integrated with an analytical device, e.g., a mass spectrometer, for studying the ionized analyte. For the most part, time-of-flight mass spectrometers ("TOF-MS") are used for this purpose, however a variety of other mass spectrometers may also be used, including an ion cyclotron resonance spectrometer (e.g., a Fourier transform ion cyclotron mass resonance spectrometer), an ion trap mass spectrometer (e.g., a high-frequency quadrupole ion trap mass spectrometer), or a hybrid instrument (e.g., a quadrupole/time-of-flight mass spectrometer, or Q-TOF).

In ionizing a sample using ionizing radiation, e.g., a laser, it is generally desirable to view an area on a sample plate to ensure that a sample has been deposited onto that area, and to direct the ionizing radiation to the sample. In particular, there is a need for an imaging system that provides a detailed image of the sample, in particular an image that shows areas of analyte crystals.

The present invention meets this, and other, needs.

SUMMARY OF THE INVENTION

The invention provides an apparatus for producing an image of a global surface of an ion source sample plate that is exterior to an ion source. In general terms, the apparatus contains a sample plate for an ion source, an imaging device (e.g., a CCD or CMOS camera) and an illumination device that is configured to produce a light beam that contacts the sample plate surface to define a grazing angle between the light beam and the sample plate surface. The apparatus may be present at a location that is remote to the ion source. Methods of imaging a surface of an ion source sample plate that employ the apparatus are also provided. The invention finds use in a variety of analytical methods. For example, the invention finds use in chemical, environmental, forensic, food, pharmaceutical and biological research applications.

The invention described herein provides an effective means for producing an image of the entire sample-containing surface of a sample plate, prior to placing the same plate in an ion source, in which all of the sample-containing areas of the sample plate can be readily distinguished from non-sample containing areas. The image may be stored in computer memory and may employed at a later date during sample ionization, e.g., to position the impact point of a laser within a sample. The invention finds particular use in identifying low volume samples, samples with low concentration of analyte and/or low concentration of matrix, and samples that are present on the surface of a textured sample plate. Prior art ion source sample plate imaging systems do not provide these features.

The invention finds particular use in illuminating sample plates that are for use in a matrix-based ion source (e.g., a MALDI in source).

DEFINITIONS

Unless defined otherwise, all technical and scientific terms used herein have the same meaning as commonly understood by one of ordinary skill in the art to which this invention belongs. Still, certain elements are defined below for the sake of clarity and ease of reference.

The term "using" is used herein as it is conventionally used, and, as such, means employing, e.g. putting into service, a method or composition to attain an end. For example, if a program is used to create a file, a program is executed to make a file, the file usually being the output of the program. In another example, if a file is used, it is accessed, read, and the information stored in the file employed to attain an end.

An "ion source" is any apparatus that produces ions for analysis in a mass spectrometry system. Exemplary ion sources include electron impact (EI) and matrix-based ion sources, as well as others. An ion source may be operated at any ambient pressure (e.g., between about $10^{-8}$ Torr to about 2,500 Torr), where "ambient pressure" is the pressure within the enclosure of the ion source. The ambient pressure within an ion source may be below 100 mTorr (e.g. high vacuum, i.e., from about $10^{-8}$ Torr to about $10^{-4}$ Torr) or at least 100 mTorr, including atmospheric pressure (approximately 760 Torr, i.e., between about 700 Torr to about 820 Torr). In other words, an ion source may be operated at atmospheric pressure, above-atmospheric pressure, or below atmospheric pressure.

The term "matrix-based ion source" refers to an ion source in which sample is combined with a matrix, generally an organic matrix, and deposited onto a sample plate prior to its ionization. A matrix-based ion sources does not rely on a volatile solvent for ionization. Exemplary matrix-based ion sources include fast atom bombardment (FAB) ion sources and matrix-assisted laser desorption ionization (MALDI) ion sources. The term "MALDI", as used herein, encompasses atmospheric pressure MALDI (AP-MALDI), as well as below atmospheric pressure MALDI (e.g., vacuum or intermediate pressure MALDI). Accordingly, a reference to a MALDI device, e.g., a MALDI ion source or a MALDI sample plate, indicates that device that is adapted for use with AP-MALDI or adapted for use with below atmospheric pressure MALDI (e.g., vacuum or intermediate vacuum MALDI) methods.

An "ion source sample plate" or "sample plate for an ion source" is a plate for receiving samples that is suitable for use within an ion source of a mass spectrometry system. An ion source sample plate can be of any shape, e.g., circular, square, rectangular, oval, etc., and may be made from any material, e.g., any metal. Sample on the sample-receiving surface of an ion source sample plate is ionized in the ion source. A sample plate may or may not contain a sample deposited thereon.

The term "adjacent" means, near, next to or adjoining. Something adjacent may also be in contact with another component, surround the other component, be spaced from the other component or contain a portion of the other component.

By "remote location" is meant a location other than the location at which an ion source is disposed. For example, a remote location could be a different location in the same room as an ion source (e.g., another bay, table or bench, etc.), a different room in the same building (e.g., another laboratory), a different building in the same building complex, or a different location in the same city, state or country, etc. When an imaging workstation apparatus is indicated as being "remote" from an ion source, the imaging workstation apparatus occupies an area that is distinct and non-overlapping with the area occupied by the ion source. The imaging workstation apparatus is not disposed within the ion source.

"Communicating" information means transmitting the data representing that information as digital (e.g., light or electrical) signals over a suitable communication channel (for example, a private or public network). "Forwarding" an item refers to any means of getting that item from one location to the next, whether by physically transporting that item or otherwise (where that is possible) and includes, at least in the case of data, physically transporting a medium carrying the data or communicating the data. The data may be transmitted to the remote location for further evaluation and/or use. Any convenient telecommunications means may be employed for transmitting the data, e.g., facsimile, modem, internet, etc.

An image of a "global surface" of a sample plate is an image of an entire sample-receiving surface of the sample plate, i.e., an image of the surface for receiving sample. If samples are disposed on the surface of a sample plate, an image of a global surface of that sample plate generally shows all of the samples present on a sample plate.

A "grazing angle" is an angle that is at or between about 0° to about 15°, such as from about 0° to about 10°.

DETAILED DESCRIPTION OF THE INVENTION

The invention provides an apparatus for producing an image of a global surface of an ion source sample plate that is exterior to an ion source. In general terms, the apparatus contains a sample plate for an ion source, an imaging device (e.g., a CCD or CMOS camera) and an illumination device that is configured to produce a light beam that contacts the sample plate surface to define a grazing angle between the light beam and the sample plate surface. The apparatus may be present at a location that is remote to the ion source.

Methods of imaging a surface of an ion source sample plate that employ the apparatus are also provided. The invention finds use in a variety of analytical methods. For example, the invention finds use in chemical, environmental, forensic, food, pharmaceutical and biological research applications.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention.

The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "an," "said" and "the" include plural referents unless the context clearly dictates otherwise.

Sample Plate Imaging Workstation

Figure 1:
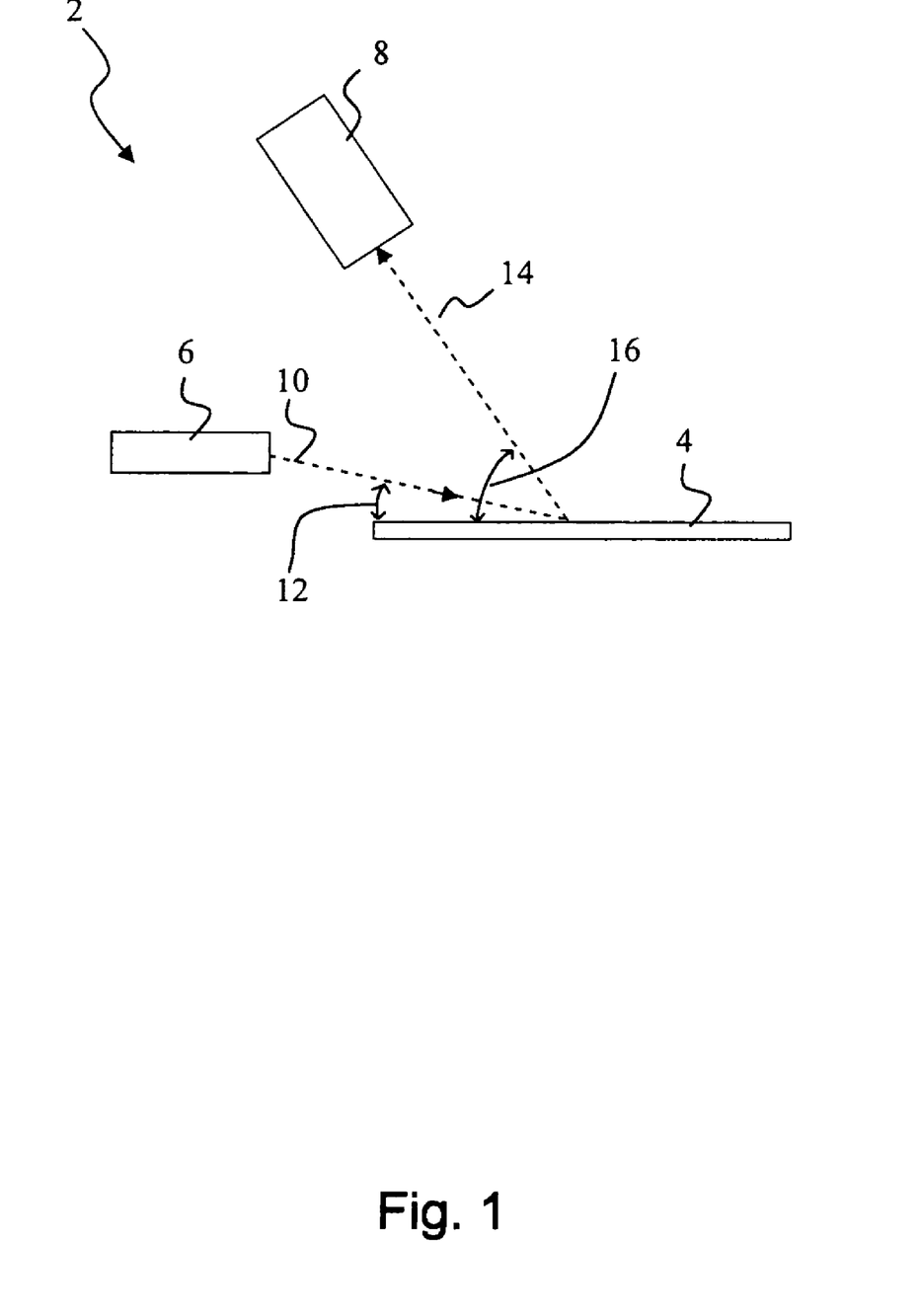
FIG. 1 schematically illustrates a first embodiment of the invention.

As noted above, the invention provides an apparatus, termed herein an "imaging workstation" for producing an image of a global surface of an ion source sample plate that is exterior to an ion source. The imaging workstation may be used to take an image of a global surface of the sample plate prior to placing the sample plate in an ion source. The image may be used by an ion source to direct ionizing radiation, e.g., a laser, to a sample present on the surface of the sample plate. The general features of an imaging workstation according to the invention are illustrated in FIG. 1. With reference to FIG. 1, an imaging workstation according to the invention 2 contains a sample plate 4, an illumination device 6 and an imaging device 8. The imaging workstation is configured so that the illumination device produces a light beam that contacts the sample plate surface to define a grazing angle between the light beam and the sample plate surface. In many embodiments, the entire sample-receiving surface of the sample plate is illuminated. The imaging device produces an image of a surface of a sample plate that is illuminated by the illumination device. In general, the entire exposed surface of the sample plate is illuminated by the illumination device, and the imaging device produces an image of the global, i.e., entire, illuminated surface of the sample plate.

In general, therefore, the imaging workstation may illuminate and capture an image of an area that is greater than the sample-receiving area of the sample plate (i.e., the area of the sample plate that is for receiving samples). The image produced by the imaging workstation may, in certain embodiments, show all of the samples deposited onto the plate (e.g., in the range of 1 to about 48 samples, 1 to about 96 samples or 1 to about 384 samples, or more, depending on how many samples are deposited). In certain embodiments therefore and depending on the size of the sample plate used, the imaging workstation may illuminate and capture an image of an area that is at least 10 cm$^2$, at least 20 cm$^2$, at least 50 cm$^2$, up to about 100 cm$^2$ or 500 cm$^2$ in size, although the areas smaller than 4 cm$^2$ and greater than 500 cm$^2$ may be captured in certain embodiments.

The grazing angle 12 is generally sufficient to minimize light scattering and reflection from the surface of the sample plate, and provide reflected, diffracted and/or scattered light from any three dimensional structures on the surface of the sample plate, thus providing good contrast between areas that contain sample and areas that do not contain sample. In certain embodiments, the grazing angle 12 may be in the range of about 0° to about 15° and, in certain embodiments, may be in the range of about 0° to about 5° or about 5° to about 10°, for example. In certain embodiments, therefore, the angle of incidence of the directed light with respect to the surface of the sample plate (i.e., the angle at which the light impacts the sample plate surface relative to a line perpendicular to the surface at the point of impact) can be large, e.g., in the range of about 75° to about 90° and, in certain embodiments, may be in the range of about 85° to about 90° or about 80° to about 85°, for example. In certain embodiments, the longitudinal axis of the light beam may be substantially parallel to (i.e., within 15° of) the surface of the sample plate.

In other words, in certain embodiments the illumination device is configured to produce a light beam having a longitudinal axis 10 that impinges on a surface of an ion source sample plate at a grazing angle 12 with respect to the surface of the sample plate. The illumination device generally provides directed light that illuminates the entire sample plate surface from one side.

Any type of light may be employed for illumination. For example, any wavelength or range of wavelengths in the range of about 600 nm to about 2000 nm may be employed. The light may be polarized or non-polarized, for example. Accordingly, a wide variety of light sources may be used in the illumination device employed herein, including light sources containing a halogen or LED lamp (e.g., a bright light LED lamp). Although not required, the illumination device may contain a mirror, lens, filter, diffuser or other optical component for manipulating light such that it can be directed to the surface of the sample plate. For example, illuminating light may be directed by a mirror towards the sample plate at a grazing angle, or light may be focused towards the sample plate using a lens. In certain embodiments, the illumination device 6 may contain an illuminating fiber optic light guide that is connected to a light source.

In general, the illumination device produces directed light and the surface of the sample plate is directly illuminated by the illumination device (i.e., the plate is illuminated by incident light, not light reflected off one or more wall or ceiling). In this context, directed light is, for example, a cone of light that that is most intense at the center of the cone, rather than at its edges, and has an cone angle in the range of about 0° to 45°, e.g., in the range of about 0° to 30°. In other words, in one embodiment, directed light employed in the invention described herein is in the form of a cone having an energy distribution such that 95% of the energy of the light is within 15° of the central longitudinal axis of the cone. In one embodiment, directional light can be produced by guiding light through an optical Fiber. Since only light inside the acceptance angle of the fiber can enter the fiber and be conducted through the fiber via total internal reflections, the light that exits the fiber is directional and generally has a cone with an opening angle that is comparable to the acceptance angle. Directional light can also be made using a focusing component, e.g., a refractive or reflective element (e.g., a lens). Directional light can also be made using an optical fiber and a focusing component. Directed light may have a cone angle in the range of about 0° to about 10°, about 10° to about 20° about 20° to about 30°, about 30° to about 40° or about 40° to about 45° In other words, the illumination device employed herein does not emanate light in all directions.

Depending on the type of illumination device used, which may or may not include additional optical elements, and the size of the area to be illuminated, the optimal distance between the illumination device and the area to be illuminated may vary greatly, but is readily determined. In certain embodiments, the distance between the illumination device and the sample plate surface to be illuminated is in the range of about 5 cm to about 100 cm, e.g., about 10 cm to about 30 cm, for example, although a distance well outside of these ranges can be readily employed.

The sample plate to be illuminated may be of any shape and may be made of any material. The surface of the sample plate to be illuminated is made of any material, including metal (e.g., gold or stainless steel or the like) or a metal nitride such as titanium nitride. The surface may be polished or irregular. The sample plate may be any type of sample plate, e.g., a sample plate for a matrix-based, e.g., MALDI, ion source, for example.

As illustrated in FIG. 1, the imaging workstation contains an imaging device for imaging the sample plate surface illuminated by the illumination device. As illustrated in FIG. 1, light 10 is directed towards the surface of sample plate 4 by illumination device 6, and light 14 reflected, diffracted and/or scattered by the surface of the sample plate 4 (i.e., light that is reflected, diffracted and/or scattered towards the imaging device) is detected by imaging device 8. Imaging device may be any type of camera, although a camera that provides a digitized output (i.e., a digital camera) is most readily employed. In certain embodiments, the camera employed may be a charged-coupled device (CCD) or complementary metal-oxide-semiconductor (CMOS) camera.

Figure 2A:
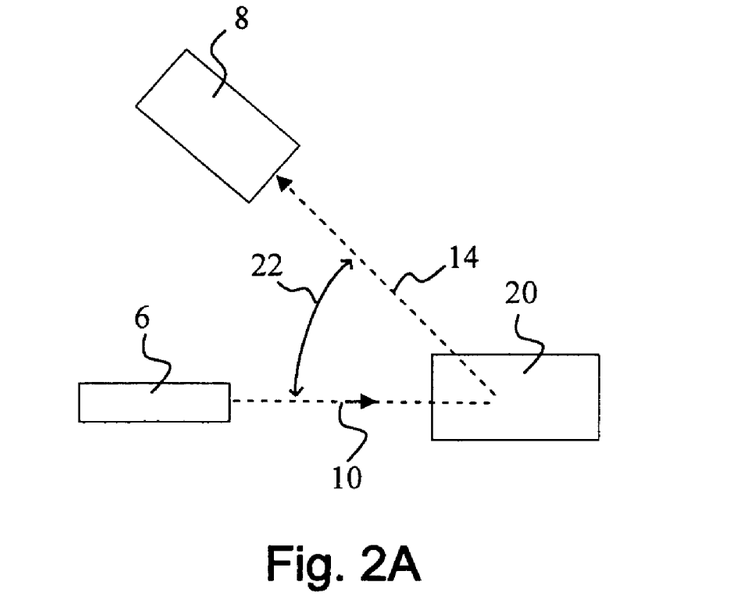
FIG. 2A schematically illustrates a second embodiment of the invention.
Figure 2B:
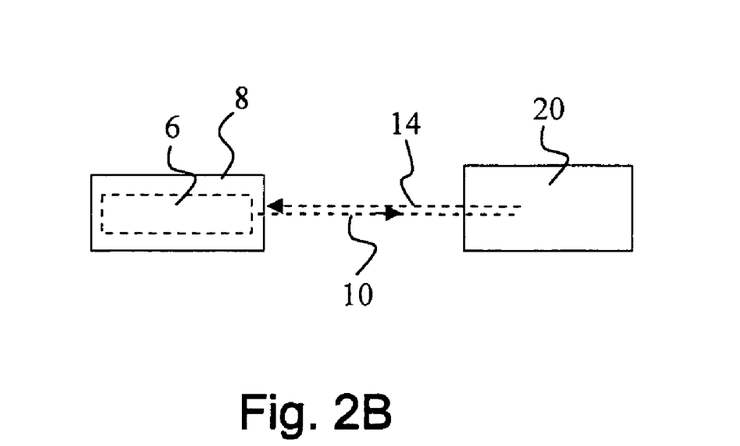
FIG. 2B schematically illustrates a third embodiment of the invention.

As illustrated in FIGS. 1, 2A and 2B, the positioning of the imaging device relative to the illumination device and the surface of the sample plate may vary greatly. The imaging device may be positioned to detect light reflected, diffracted and/or scattered, or absorbed and emitted via quantum process at angle 16 with respect to the surface of sample plate 4. Angle 16 may be any angle suitable for imaging the illuminated region. In particular embodiments, angle 16 is greater than angle 12, and is in the range of about 20° to about 90°, e.g., about 30° to about 60° or about 40° to about 50°, relative to the surface of the sample plate. In particular embodiments, the imaging device may be positioned directly above the sample plate (i.e., at 90° relative to the surface of the sample plate). FIGS. 2A and 2B illustrate an embodiment of the apparatus viewed from the "z" direction if the imaging device is not positioned directly above the sample plate (i.e., from above the surface of the sample plate 20, where the "x" and "y" directions are parallel to the surface of the sample plate). As illustrated in FIG. 2A and as viewed from the z direction, the illuminating light 10 and detected light 14 form angle 22. Angle 22 may be any angle in the range of 0° to 180° in either direction (i.e., clockwise or anti-clockwise). As illustrated in FIG. 2B, illuminating light 10 and detected light 14 may be co-planer (i.e., having an angle of 0°). In such embodiments, the illumination device 6 may be beneath the imaging device 8 in the z direction.

In general, the imaging device is positioned and configured to avoid direct light from the illumination device and maximize contrast between sample-containing and non-sample containing areas of the plate. In certain embodiments the illuminated area may be imaged and viewed from the same side with respect to the surface of the sample plate. Accordingly, in certain embodiments, angle 22 may in the range of about 0°, 0° to about 5°, about 5° to about 10°, about 10° to about 20°, or about 20° to about 30°, in either direction.

Detected light 14 may be directed to imaging device 8 via any number of mirrors, lenses or other optical components that may be present between imaging device 8 and sample plate 20.

In certain embodiments, the imaging device receives light from the illuminated surface such that the light detector of the imaging device (i.e., the array of photodetectors or pixel cells) lies perpendicular to the direction of light. In other words, in certain embodiments, light entering imaging device 8 may travel in a direction that is perpendicular to the surface of the light detector employed in the imaging device. In other embodiments, the light entering the imaging device may travel in a direction that is not perpendicular to the surface of the light detector.

In addition, in certain embodiments, the workstation may contain a curtain or may be enclosed to prevent ambient light (e.g., light entering a room from a window or light produced by a ceiling or other lamp) from illuminating the sample plate during imaging.

As noted above the imaging workstation of the invention is for producing an image of a sample plate prior to placing the sample plate in an ion source. Accordingly, the imaging workstation is generally positioned exterior to an ion source, i.e., occupying a position that is distinct and non-overlapping with the ion source. For example, the imaging workstation may be located on the same table or bench as the ion source but not within the ion source, the imaging workstation may be located on a different table or bench in the same room (e.g., a different table in the same laboratory) as the ion source, or the imaging workstation may be located in a different room or building to the ion source.

In a further embodiment of the invention, the imaging device 8 may produce a signal representing an image of the illuminated area (e.g., an analog or digital signal representing the image) that is transferred to signal processing device for processing. The signal processing device may be a computer, and the signal may be stored as a file in a computer readable medium, e.g., computer memory. The stored file may be accessible to image analysis software, and such software may be executed by the computer to analyze the image. In one embodiment, signal processing device is a display, e.g., a monitor such as a computer monitor or the like.

Examples of computer-readable media include floppy disks, magnetic tape, CD-ROM, a hard disk drive, a ROM or integrated circuit, a magneto-optical disk, or a computer readable card such as a PCMCIA card and the like, whether or not such devices are internal or external to the computer. A file containing information may be "stored" on computer readable medium, where "storing" means recording information such that it is accessible and retrievable at a later date by a computer. With respect to computer readable media, "permanent memory" refers to memory that is permanent. Permanent memory is not erased by termination of the electrical supply to a computer or processor. Computer hard-drive ROM (i.e. ROM not used as virtual memory), CD-ROM, floppy disk and DVD are all examples of permanent memory. Random Access Memory (RAM) is an example of non-permanent memory. A file in permanent memory may be editable and re-writable.

Figure 3:
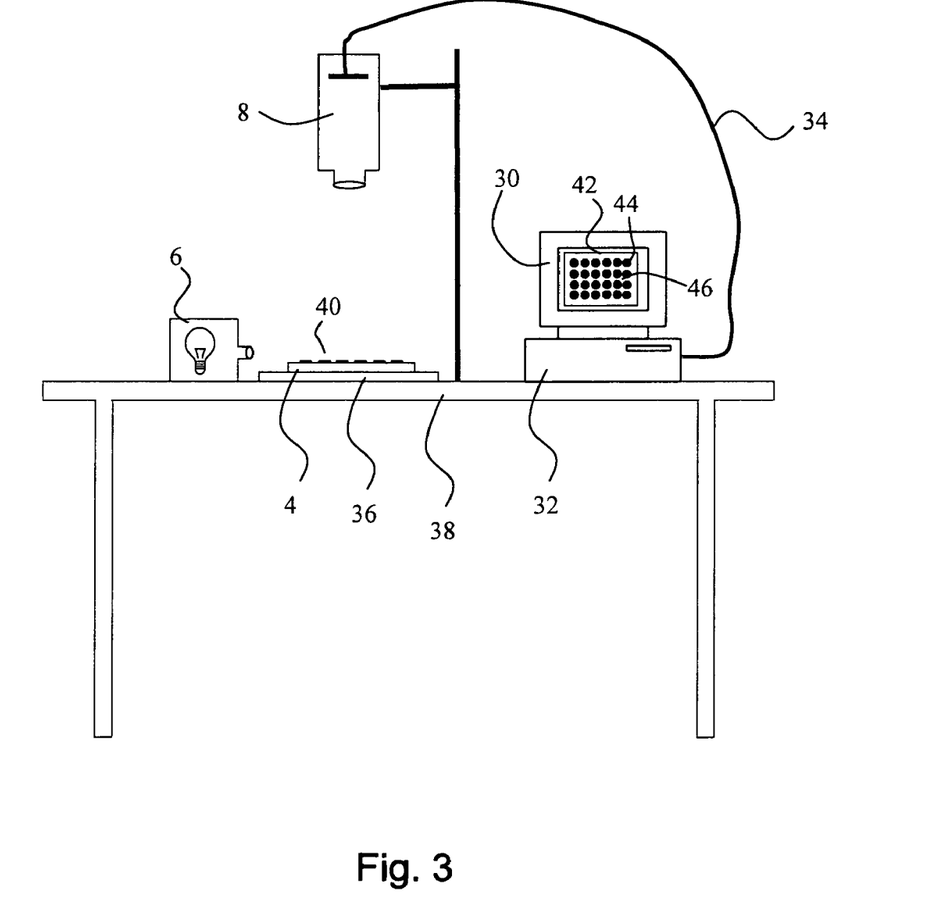
FIG. 3 schematically illustrates a fourth embodiment of the invention.

The general features of an exemplary imaging workstation in accordance with one embodiment of the invention are illustrated in FIG. 3. In this embodiment, the system contains a sample plate 4, an illumination device 6 for illuminating the surface of the sample plate by directing light onto the sample plate at a grazing angle, an imaging device 8 for producing an image of the illuminated sample plate. The imaging device may be connected to a monitor 30 and a computer 32 having a computer readable medium for storing images. The connection 34 between the imaging device 8 and the computer 32 may be an electrical cable or wire, for example, or, in certain embodiments, a wireless connection. The imaging workstation may, in certain embodiments, contain a sample plate holder 36 for positioning the sample plate 4 in the field of view of the imaging device 8. The sample plate holder may contain reference marks and/or one or more devices (e.g. a spring-loaded clip or the like) for positioning and/or holding a sample plate in the holder. The imaging workstation may be located on the top of a table 38 that is in a laboratory, for example. As illustrated in FIG. 3, the sample plate contains a plurality of samples 40 (e.g., at least 2, at least 8, at least 24, at least 96 or at least 384, for example) deposited thereon. The sample-containing surface of the sample plate 4 is illuminated by illumination device 6 and imaged by imaging device 8 to produce an image 42 of a global surface of the sample plate in which sample-containing areas, e.g., 44, are clearly distinguishable from areas that do not contain sample 46.

Figure 4:
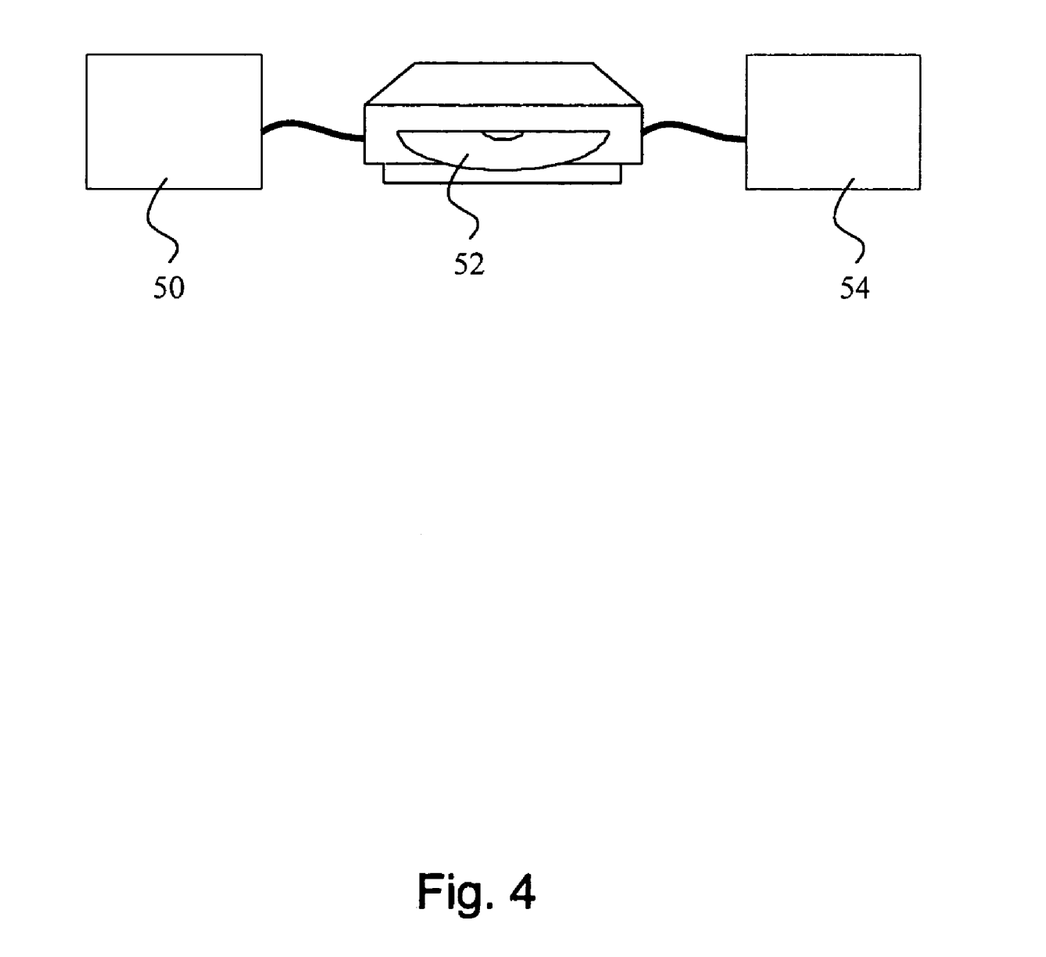
FIG. 4 schematically illustrates a fifth embodiment of the invention.

In certain embodiments and as illustrated in FIG. 4, an imaging workstation of the invention 50 may be connected to an ion source 54 via a computer readable medium 52 in which an image of a sample plate may be stored after image capture and retrieved before, during or after placement of the sample plate in an ion source. In one embodiment, the computer readable medium 52 is a component of a dedicated computer that is linked to both the imaging device of the workstation (or a computer linked thereto) and the ion source. In another embodiment the computer readable medium 52 is a component of a server computer that is part of a computer network that links the imaging device of the workstation and the ion source. Finally, in another embodiment the computer readable medium 52 is a component of an world wide web server that can be accessed by both the imaging device (or a computer linked thereto) and the ion source.

In accordance with the above, the invention also provides a system for ionizing a sample. The system generally contains an apparatus for imaging a global surface of a sample plate for an ion source to produce an image, and an ion source that is spaced from the apparatus. The apparatus generally contains: i) an illumination device for producing a light beam that contacts the sample plate surface to define a grazing angle between the light beam and the sample plate surface; and ii) an imaging device for producing an image of a global surface of the sample plate. The ion source is generally configured to: i) input the image of a global surface of the sample plate; and ii) direct ionizing radiation to a sample on the sample plate using the image. In particular embodiments, the ion source may position a sample in the path of a laser beam using the image, either by moving the sample plate relative to a stationary laser, by moving a laser relative to a stationary sample plate, or by both moving a sample plate and a laser. As illustrated in FIG. 4, the imaging workstation and the ion source may be linked via a computer memory that is accessible by both the imaging workstation and the ion source.

The above-described imaging workstation is generally employed to produce an image of an area of a surface of a sample plate in which sample-containing areas are readily distinguishable from non-sample containing areas. The image produced may be employed in a number of methods.

In one embodiment, the image may be viewed to assess the quality of sample deposition onto the sample plate, e.g., to assess whether samples had been successfully deposited and/or how consistent deposition had been across the plate. In this embodiment, the images may be part of a general quality control procedure to identify and discard sample plates of low quality or identify samples that are not correctly deposited.

In other embodiments, the image may be used in a method for ionizing a sample on a sample plate for an ion source. This method may involve: a) capturing an image of global surface of a sample plate for an ion source by: i) illuminating a surface of said sample plate by directing a light beam onto the surface, the light beam contacting the sample plate surface to define a grazing angle between the light beam and the sample plate surface; and ii) producing an image of a global surface of sample plate using an imaging device; b) storing the image; c) placing the sample plate in an ion source; and d) employing the image to ionize a sample on the plate. This method may include positioning the sample in an ionizing laser using the image.

For example, the image may be analyzed, and sample parameters describing the shapes, dimensions and locations of samples on the sample plate may be determined (either manually or using software). The sample parameters for a plate may be stored in a file, in memory, and used by ion source to direct a laser to a sample-containing area on that sample plate, after the sample plate has been placed within the ion source. Such methods are generally described in great detail in co-pending U.S. patent application Ser. No. 10/429,234, filed on May 2, 2003 and published as US20040217278, which patent application is incorporated herein in its entirety for all purposes. In this embodiment, for example, a sample plate may be placed within the ion source and the parameter file for that sample plate may be retrieved from a computer memory (e.g., manually or automatically using a barcode associated with the sample plate) and the parameter filed employed in directing the ionizing laser of the ion source to sample containing areas of the sample plate.

In one embodiment, therefore, the invention provides a method of producing an image of a surface of a sample plate for an ion source, prior to placing the sample plate in the ion source, that involves illuminating the area by directing light onto the area at a grazing angle with respect to the surface of the sample plate. The method may further involve storing the image on a computer-readable medium, and/or analyzing the image to produce a sample parameter file. The sample parameter file may be employed by a ion source, after placement of the sample plate in the ion source, to direct a laser to a sample-containing region of the sample plate. In other words, in certain embodiments, the above-described sample plate illumination apparatus is employed to produce an image of a sample plate that is exterior to (i.e., not present in) an ion source.

The image produced by the imaging workstation may be further used to ensure that once the sample plate has been placed in an ion source, the impact point of the laser of the ion source falls within a sample-containing area. In this embodiment, for example, a sample plate may be placed within the ion source and an image of the sample plate may be displayed on a monitor associated with the ion source. The monitor may also indicate the laser impact point of the laser of the ion source (indicated by cross-hairs, for example) superimposed upon the image. Using the image as a guide, the sample plate may be moved (manually or automatically) relative to the laser impact point of the laser to ensure that a sample-containing region is impacted by the laser during ionization.

In embodiments of particular interest, the imaging workstation described above may be employed to visualize the deposition (or "spotting" as it may be referred to) of samples onto the sample plate. In such embodiments, a sample plate containing a surface for receiving samples is placed in the imaging workstation and imaged. Samples may be deposited onto the sample receiving surface of the sample plate, and imaged as the samples are deposited. In an exemplary embodiment, the imaging workstation may be employed in determining a position upon which a sample may be deposited. For example, in this embodiment, the sample plate may be viewed to determine the areas upon which samples have already been deposited, and a further sample may be deposited at a position such that, after deposition, the deposited sample does not overlap with other samples. In another embodiment, the imaging workstation may be employed to verify that a sample has been correctly deposited (e.g., deposited at an appropriate position) or to verify the position upon which a sample is deposited. In these embodiments, the deposition of the samples onto the sample plate may be done manually or automatically (i.e., using a spotting machine). Accordingly, in certain embodiments, the imaging workstation may be part of a spotting workstation at which samples may be manually deposited (e.g., using a pipette or the like) onto a sample plate. In other embodiments, the imaging workstation may be integrated with (i.e., a component of) an automated sample deposition system. Such automated systems are well known in the art and are readily adapted to include the above-described imaging workstation. Exemplary automated deposition systems that may be employed with an imaging workstation include the PAL MALDI processor (Presearch, UK), the SunCollect MALDI spotter (SunChrom, Germany) and the ETTAN spotter (Amersham Biosciences, NJ), among others.

In accordance with the above, the imaging workstation described above may be employed in conjunction with (i.e., may be linked to via a computer memory or may produce images that are later used by) a mass spectrometer system. Mass spectrometer systems are generally well known in the art and therefore do not need be described in any great detail herein. In general terms, the mass spectrometer system contains an ion source (e.g., a matrix-based ion source such as a MALDI or AP-MALDI ion source) and a mass analyzer containing an ion detector, connected by one or more intermediate chambers. As is conventional in the art, the ion source and the mass analyzer are separated by at least one intermediate vacuum chamber through which ions are transported after they have exited the ion source via an ion exit orifice. More or less vacuum stages may be employed depending on the requirements of the system.

Mass analyzer and detector may comprise a quadrupole, triple quadrupole, three dimensional ion trap, linear ion trap, time-of-flight (TOF), magnetic sector, Fourier transform ion-cyclotron resonance (FTICR), or other mass to charge analyzer known in the art, for example.

In use, if the ion source is held at atmospheric pressure, intermediate chamber is held at a pressure that is around two orders of magnitude less than the ambient pressure, and mass analyzer is held at a pressure of around two to four orders of magnitude less than that of the intermediate chamber. The ions exit ion source via its ion collection capillary and are swept into the vacuum chamber, usually via a skimmer, in a stream of gas due to the pressure difference between ion source and chamber. The ions pass through the chamber (and any ion guide, ion beam shaping or focusing lenses that may be present) and enter the mass analyzer. The mass analyzer determines the m/z ratio of the ions, and thus is useful for determining molecular weights of analytes in the sample. The ion guide may be a multipole ion guide, a segmented multipole ion guide, a sequential disk RF ion guide, an ion funnel or other ion guide known in the art. The ion guide may extend continuously into one or more vacuum pumping stages or may begin and end in a single vacuum stage.

The invention finds use in methods of sample mass analysis, where a sample may be any material deposited and crystallized onto the surface of a sample plate or mixture of materials. Samples typically contain one or more components of interest. Samples may be derived from a variety of sources such as from foodstuffs, environmental materials, a biological sample such as tissue or fluid isolated from a subject (e.g., a plant or animal subject), including but not limited to, for example, plasma, serum, spinal fluid, semen, lymph fluid, the external sections of the skin, respiratory, intestinal, and genitourinary tracts, tears, saliva, milk, blood cells, tumors, organs, and also samples of in vitro cell culture constituents (including but not limited to conditioned medium resulting from the growth of cells in cell culture medium, putatively virally infected cells, recombinant cells, and cell components), or any biochemical fraction thereof.

EXAMPLE

The following example is put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

Figure 5:
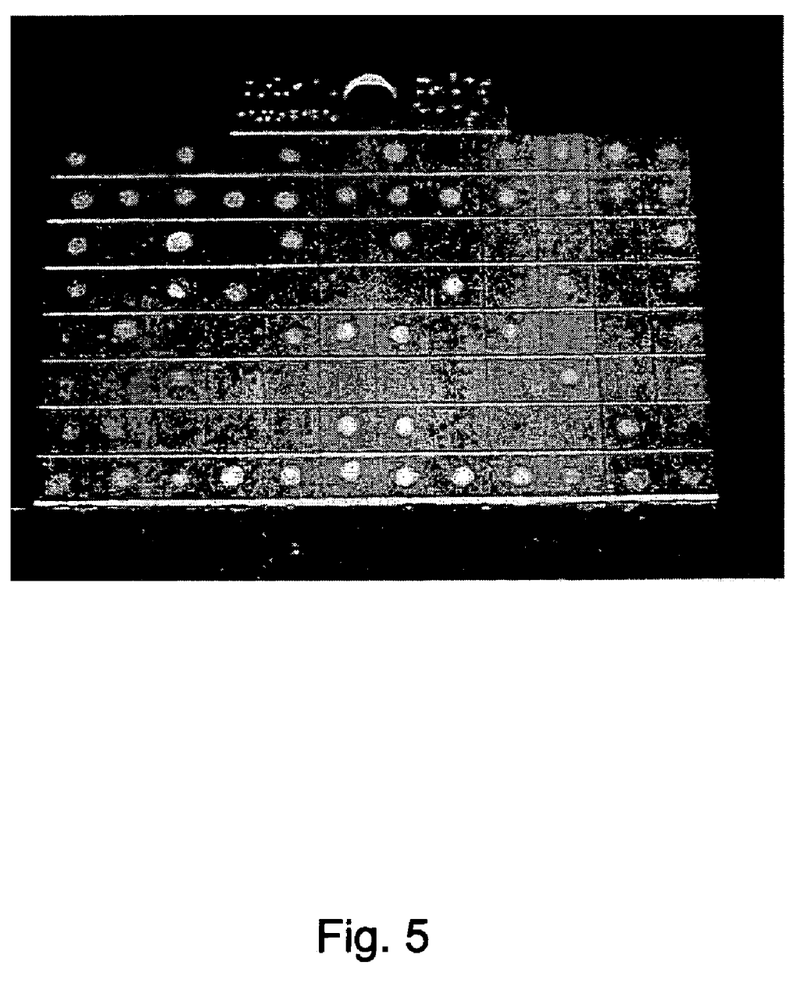
FIG. 5 illustrates exemplary results obtained using one embodiment of the invention.

A fiber optic system containing a 3 inch Model 9135 Lightline fiber optic cable, a model 9530 cylindrical lens and a model 3900 Smartlite light source (Illumination Technologies, Inc., East Syracuse, N.Y.) was used to direct light onto a sample at an angle of approximately 7° relative to the surface of sample plate, and capture an image (FIG. 5) of the sample plate. The image was captured using a standard RS170 CCD camera mounted at approximately 45° relative to the surface of sample plate, above the light source.

Figure 6:
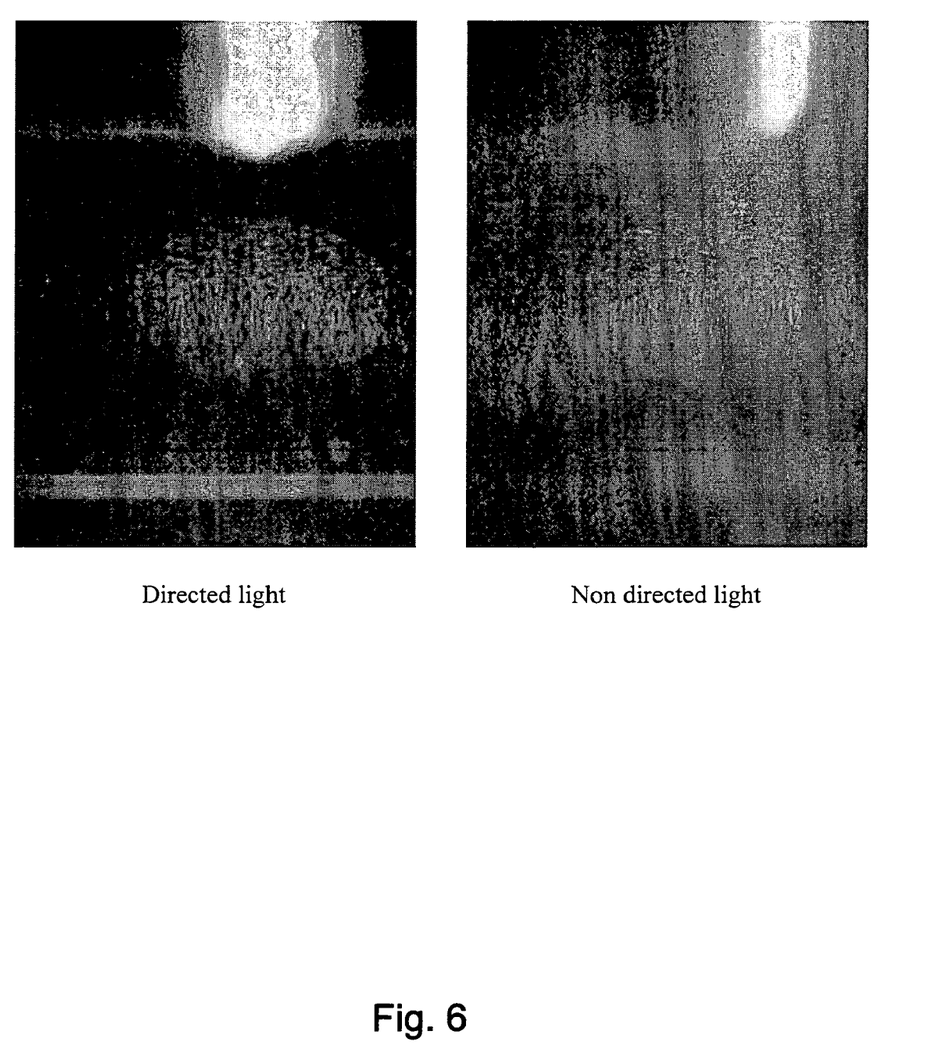
FIG. 6 illustrates further exemplary results obtained using one embodiment of the invention.

FIG. 6 shows an image of a sample obtained from the system described above (left hand panel) and an image of the same sample obtained using an otherwise identical system, except the light was not directed onto the sample at a grazing angle.

It is evident from the above discussion that the invention provides an important means for illuminating a sample plate for an ion source, prior to placing the sample plate within the ion source, so that sample-containing regions can be readily distinguished from areas that do not contain sample. Accordingly, the present invention represents a significant contribution to the mass spectrometry arts.

All publications and patents cited in this specification are herein incorporated by reference as if each individual publication or patent were specifically and individually indicated to be incorporated by reference. The citation of any publication is for its disclosure prior to the filing date and should not be construed as an admission that the present invention is not entitled to antedate such publication by virtue of prior invention.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. An apparatus for imaging a global surface of an ion source sample plate that is exterior to an ion source, comprising:
   an ion source sample plate that is exterior to an ion source;
   an imaging device spaced from said sample plate for producing an image of a global surface of said sample plate; and
   an illumination device adjacent to the sample plate for illuminating said surface, the illumination device for producing a light beam that contacts the sample plate surface to define a grazing angle between the light beam and the sample plate surface.

2. The apparatus of claim 1, wherein said image is an image of an entire surface of said sample pate.

3. The apparatus of claim 1, wherein said image indicates all of the samples present on said sample plate.

4. The apparatus of claim 1, wherein said grazing angle is in the range of about 0° to about 15°.

5. The apparatus of claim 1, wherein said grazing angle is in the range of about 0° to about 10°.

6. The apparatus of claim 1, wherein said apparatus is present at a location that is remote to said ion source.

7. The apparatus of claim 1, wherein said imaging device is coupled to a display.

8. The apparatus of claim 1, wherein said imaging device is coupled to a computer having a memory.

9. The apparatus of claim 1, wherein said illumination device comprises a fiber optic light guide connected to a light source.

10. The apparatus of claim 1, wherein said illumination device comprises a diffuser.

11. The apparatus of claim 1, wherein said imaging device is a CCD or CMOS camera.

12. The apparatus of claim 1, wherein said sample plate is for a matrix-based ion source.

13. The apparatus of claim 1, wherein said sample plate is for a MALDI ion source.

14. A method for producing an image of a global surface of a sample plate that is exterior to an ion source, comprising:
   a) illuminating a surface of said sample plate by directing a light beam onto said surface, said light beam contacting the sample plate surface to define a grazing angle between the light beam and the sample plate surface; and
   b) producing an image of a global surface of sample plate using an imaging device.

15. The method of claim 14, wherein said image indicates all of the samples present on said sample plate.

16. The method of claim 14, wherein said grazing angle is in the range of about 0° to about 15°.

17. The method of claim 14, wherein said grazing angle is in the range of about 0° to about 10°.

18. The method of claim 14, further comprising:
   c) storing said image in memory of a computer.

19. The method of claim 18, further comprising:
   d) placing said sample plate into said ion source after said image is produced.

20. The method of claim 19, further comprising:
   e) accessing said stored image after said sample plate has been placed into said ion source.

21. A method for ionizing a sample on a sample plate for an ion source, comprising:
   a) capturing an image of a global surface of a sample plate for an ion source by:

i) illuminating a surface of said sample plate by directing a light beam onto said surface, said light beam contacting the sample plate surface to define a grazing angle between the light beam and the sample plate surface; and ii) producing an image of a global surface of sample plate using an imaging device;

b) storing said image;

c) placing said sample plate in said ion source; and d) employing said image to ionize a sample on said plate.

22. The method of claim 21, wherein step d) includes positioning said sample in an ionizing laser using said image.

23. A method for depositing a sample on a sample plate for an ion source, comprising:

a) capturing an image of a surface of a sample plate for an ion source by:

i) illuminating a surface of said sample plate by directing a light beam onto said surface, said light beam contacting the sample plate surface to define a grazing angle between the light beam and the sample plate surface; and ii) producing an image of a surface of sample plate using an imaging device; and b) depositing a sample onto said sample plate surface.

24. A system for ionizing a sample, comprising:

a) an apparatus for imaging a global surface of a sample plate for an ion source to produce an image, comprising:

i. an imaging device for producing an image of a global surface of said sample plate; and ii. an illumination device for producing a light beam that contacts the sample plate surface to define a grazing angle between the light beam and the sample plate surface; and b) an ion source that is spaced from said apparatus, wherein said ion source is configured to:

i) input said image of said sample plate; and ii) employing said image to direct radiation to a sample on said sample plate.

25. The system of claim 24, wherein said image is employed to position said sample in the path of a laser beam.

26. The system of claim 24, wherein said apparatus and said ion source are linked via a computer memory that is accessible by said apparatus and said ion source.

27. The system of claim 24, wherein said grazing angle is in the range of about 0° to about 15°.

28. The system of claim 24, wherein said grazing angle is in the range of about 0° to about 10°.

* * * * *